(12) United States Patent
Untch

(10) Patent No.: US 9,016,036 B2
(45) Date of Patent: Apr. 28, 2015

(54) ENVIRONMENTALLY SEALED DOCKING DEVICE AND METHOD, HAVING A ZIPPER AND A SLIDE

(75) Inventor: Günter Untch, Müllheim (DE)

(73) Assignee: Flecotec AG, Mullheim (DE)

( * ) Notice: Subject to any disclaimer, the term of this patent is extended or adjusted under 35 U.S.C. 154(b) by 816 days.

(21) Appl. No.: 13/265,072

(22) PCT Filed: Apr. 21, 2010

(86) PCT No.: PCT/EP2010/002433
§ 371 (c)(1),
(2), (4) Date: Dec. 9, 2011

(87) PCT Pub. No.: WO2010/121793
PCT Pub. Date: Oct. 28, 2010

(65) Prior Publication Data
US 2012/0090279 A1    Apr. 19, 2012

(30) Foreign Application Priority Data

Apr. 24, 2009    (DE) .................... 10 2009 018 565

(51) Int. Cl.
*A44B 19/00* (2006.01)
*A44B 19/46* (2006.01)
*B65B 61/18* (2006.01)
*B65B 51/04* (2006.01)
(Continued)

(52) U.S. Cl.
CPC .......... *B65G 69/183* (2013.01); *B65D 33/2591* (2013.01); *Y10S 493/927* (2013.01)

(58) Field of Classification Search
CPC .. B65G 69/183; B65D 33/2591; B65D 33/25; B65D 33/2508; B65B 51/046; B65B 61/188; A44B 19/00; A44B 19/16

USPC ............... 53/480, 133.4, 133.2, 284.7, 139.2; 383/5, 42, 63, 64, 40, 61.3, 203, 204, 383/207, 67; 493/212–214, 927; 24/64; 29/403, 409, 410, 768

See application file for complete search history.

(56) References Cited

U.S. PATENT DOCUMENTS

| 5,211,482 A | 5/1993 | Tilman |
| 6,178,722 B1 | 1/2001 | McMahon |
| 6,637,937 B2 | 10/2003 | Bois |

(Continued)

FOREIGN PATENT DOCUMENTS

| DE | 89 10 950.3 | 10/1989 |
| DE | 103 35 325 A1 | 3/2005 |

(Continued)

*Primary Examiner* — Hemant M Desai
*Assistant Examiner* — Praachi M Pathak
(74) *Attorney, Agent, or Firm* — Muirhead and Saturnelli, LLC

(57) ABSTRACT

A closure having two profile strips for an at least partially flexible container for connecting a first container to a second container in a manner sealed against the environment in a such a way that a closed docking position can be obtained. Further the closure provides for conducting a flow in a sealed manner against the environment in a flow direction through the closure from the first container into the second container in such a way that an open docking position can be obtained. According to the described system, the second container facing the first container is designed with an identical closure that engages in the closure of the first container in the open docking position and forms a channel for the flow in the flow direction together with the closure.

20 Claims, 16 Drawing Sheets

(51) Int. Cl.
  *B65D 33/25*   (2006.01)
  *B65G 69/18*   (2006.01)

(56) References Cited

U.S. PATENT DOCUMENTS

| | | | | |
|---|---|---|---|---|
| 7,300,207 | B2 * | 11/2007 | Linneweil | 383/35 |
| 7,487,808 | B2 * | 2/2009 | Stoye et al. | 141/315 |
| 7,770,936 | B2 * | 8/2010 | Koch et al. | 285/235 |
| 8,060,992 | B2 * | 11/2011 | Koch et al. | 24/384 |
| 2005/0084181 | A1 * | 4/2005 | Koch et al. | 383/22 |
| 2007/0191167 | A1 | 8/2007 | Koch et al. | |
| 2007/0277478 | A1 | 12/2007 | Koch et al. | |
| 2008/0276435 | A1 * | 11/2008 | Koch et al. | 24/400 |

FOREIGN PATENT DOCUMENTS

| | | |
|---|---|---|
| DE | 10 2004 003511 A1 | 8/2005 |
| DE | 102004003511 A1 | 8/2005 |
| DE | 699 35 557 T2 | 12/2007 |
| DE | 601 33 818 T2 | 5/2009 |
| WO | WO 88/04634 A1 | 6/1988 |
| WO | WO 2005/012089 A2 | 2/2005 |
| WO | WO 2005/012104 A2 | 2/2005 |
| WO | WO 2005/070776 A1 | 8/2005 |

* cited by examiner

ENVIRONMENTALLY SEALED DOCKING DEVICE AND METHOD, HAVING A ZIPPER AND A SLIDE

TECHNICAL FIELD

This application relates to a closure having two profile strips for an at least partially flexible receptacle, and to a slide for such a closure, and also to a method for the environmentally sealed connection of two at least partially flexible receptacles.

BACKGROUND OF THE INVENTION

Liquid or solid bulk materials are often contained in receptacles. The receptacles can be receptacles that are formed in an at least partially flexible manner. Such receptacles are obtainable for example as bags which are suspended in containers. The receptacles are preferably produced from continuous tubes and closed in a variety of manners as tube sections. Such receptacles are used particularly frequently for packing, transporting or storing liquid or solid bulk materials.

In practice, it is often difficult or even risky to empty, fill or transfer the contents of such receptacles. Particularly when the bulk materials in the receptacles are hazardous or sensitive materials, contamination of the bulk material, and also contamination of the surroundings with bulk material, absolutely has to be avoided. To this end, all the closures and connections, in particular for docking such receptacles, should be configured in as environmentally sealed a manner as possible. Against the background of these problems, special closures for receptacles described at the beginning have been developed, said closures being intended to assist in the prevention of contamination in each case.

Such closures can be gathered for example from DE 10 2004 003 511 B4. However, the stability of the connections of such closures is often not sufficiently secure.

The invention is based on the problem of creating an easily handleable closure for receptacles mentioned at the beginning, said closure allowing such receptacles to be connected together or to other process engineering devices in an environmentally sealed manner and also allowing environmentally sealed guidance of a throughflow between receptacles that are connected together or the connected devices. It should furthermore be possible to use this closure as far as possible universally on an at least partially flexible receptacle without the closure having to be part of the receptacle. Such closures should be able to produce between the receptacles a connection which is as firm as possible and in particular does not tear off in the event of force shocks in the throughflow direction.

SUMMARY OF THE INVENTION

This problem is solved according to the invention by a closure having two profile strips for an at least partially flexible receptacle, by a slide therefor and also by a method, as discussed in detail elsewhere herein.

The invention allows a first receptacle to be connected in an environmentally sealed manner to a second receptacle, so that a closed docking position can be taken up. Switching into an opened docking position from the closed docking position ensures environmentally sealed guidance of a throughflow in a throughflow direction through the closure from the first receptacle into the second receptacle.

According to the invention, the second receptacle has an identical closure facing the first receptacle, it being possible to bring said identical closure into engagement with the closure of the first receptacle in order to achieve the closed docking position. After switching into the opened docking position, the connected closures of the receptacles form a channel for the throughflow of the bulk material in the throughflow direction.

In the closed docking position, the profile strips arranged opposite one another close one of the receptacles between one another. The profile strips have closure elements that are oriented transversely to the throughflow direction and in the inward direction, and also in some cases in the outward direction, with respect to the channel.

A first profile strip of the closure of the first receptacle extends beyond the receptacle in the throughflow direction and is formed on an inner side, which faces the receptacle, with at least one first and one second closure element. All of the closure elements are arranged for action in a manner oriented transversely to the throughflow direction and in the inward direction with respect to the channel, i.e. likewise transversely to the throughflow direction.

A second profile strip of the closure of the first receptacle is formed on a second inner side, which faces the receptacle, with at least one third closure element. The at least one third closure element, too, is arranged in a manner oriented transversely to the throughflow direction and in the inward direction with respect to the channel, in order to be able to act transversely to the throughflow direction. Formed additionally on an outer side, which faces away from the receptacle, of the second profile strip, is at least one fourth closure element, which acts transversely to the throughflow direction and in the outward direction with respect to the channel, wherein all of the fourth closure elements are arranged exclusively in a manner oriented transversely to the throughflow direction.

The inner side of the first profile strip has in the throughflow direction a first contact region and a second contact region. In the first contact region, the second closure element of the first profile strip and the third closure element of the second profile strip close the first receptacle, in that the second closure element and the third closure element engage in one another. The second contact region of the first profile strip extends in the throughflow direction beyond the first receptacle and the opposite second profile strip. In the second contact region, the closure of the first receptacle can be connected to the identical closure of the second receptacle. To this end, the first closure element of the first profile strip of the identical closure of the second receptacle and the fourth closure element on the outer side of the second profile strip of the closure of the first receptacle engage in one another. Similarly, provision is of course made of the engagement of the respectively other first and fourth closure elements.

Advantageous embodiments have either an actuator or a slide for transferring the closure or the docked closures from the closed docking position into the opened docking position.

Advantageous embodiments of the identical closures are formed as universal closures. These closures for two receptacles, which may be different from one another within certain limits, can then be connected together so as to produce secure, environmentally sealed connections between the profile strips of the closures.

To this end, all of the closure elements of the profile strips are oriented transversely to the flow direction and inwardly or outwardly with respect to the channel so that loads in the throughflow direction can be compensated with greater reliability. For example, while bulk material is being transferred from the first receptacle into the second receptacle, force shocks occur on the closures in the throughflow direction when the bulk material drops onto the bottom of the second receptacle. The closure elements, which are arranged exclusively transversely to the throughflow direction, withstand such force shocks in the throughflow direction, since they effectively prevent the profile strips from peeling off.

These connections are released in a controlled manner, in particular by means of the actuator or by means of the slide, either between the profile strips of one closure or between the profile strips of two closures, so as to avoid uncontrolled opening of the receptacles. The advantageous embodiments having an actuator or slide can be actuated either manually or in automatic docking devices.

Advantageously, the receptacles having identically formed closures can be pushed laterally together, in order to produce the environmentally sealed connections of the profile strips to one another. Lateral pushing together leads to a secure connection both in the case of one receptacle being closed by way of the closure and in the case of the identical closure being pushed laterally against the closure in order to produce a throughflow between two receptacles. This is also referred to as the docking of two receptacles together.

In addition to the firmness of the connection, lateral docking has the practical advantage for the user that a lateral arrangement of the receptacles with respect to one another can be implemented much more conveniently. For example, an empty receptacle can readily be brought up to a full receptacle. In order to dock the receptacles together, it is now not necessary for either of the receptacles to be moved vertically, since the docking has been provided laterally.

One advantage of the arrangement of closure elements oriented exclusively transversely to the throughflow direction, be they designed in a positive or negative manner, is that the closure elements are positioned in a manner conducive to latching. All of the closure elements which are to be brought into engagement with one another during the closing operation are oriented transversely to the throughflow direction and in the inward direction or outward direction with respect to the channel.

During the closing operation, the profile strips are moved or curved in a plane which is defined approximately perpendicularly to the throughflow direction. In this plane, the profile strips can be bent slightly, in a similar manner to a belt which is wound around a body. In a similar manner to the belt, the profile strips have two wide and two narrow sides respectively opposite one another. The profile strips are thus bent about their wide sides while the closure elements engage in one another. In comparison therewith, the narrow sides of the belt likewise do not rest against the body, since the belt could not be wrapped around the body in that way. If a closure element to be brought into engagement were oriented in the throughflow direction, for example were fastened to one of the short sides, the profile strips would have to move in a plane parallel to the throughflow direction. However, in such a plane the profile strips tend to snap quickly, since they are formed in a rigid manner in this plane.

In an advantageous embodiment, the inner sides and the outer sides are formed as contact surfaces with forms that are complementary to one another. This can further improve the sealing of the closure.

In advantageous embodiments, the closure elements engage in one another in the manner of a groove-spring connection and/or a hooking connection. A combination of these types of connection in the form of a hooking groove-spring connection is particularly advantageous. In this case, the spring can be hooked in the groove. The hooking engagement is released by the spring being deflected and withdrawn from a corresponding recess in the groove.

It is advantageous to form the closure elements for interaction in a groove-spring connection because it is possible to reproduce a corresponding extrusion of the profile strips as plastic strips in particularly favorable mold geometries. The closure elements formed in such a way furthermore close the receptacles particularly well in the groove-spring connection on account of the usually thin wall thicknesses of the receptacles. The groove-spring connections are moreover particularly easily accessible for the user and so it is possible to quickly check for the presence of contamination, which would compromise secure docking.

Besides the groove-spring connection, or within this kind of connection, other types of closure elements are also conceivable. For example, closure elements can engage in one another transversely to the throughflow direction by hooking in one another.

According to an advantageous embodiment, a closure element engages in the other without a closure element sinking into a further closure element in the manner of a groove-spring connection. According to this embodiment, such an engagement is executed with J-shaped closure elements as a purely hooking connection, with the straight limb of the J being fastened to the profile strip and the curved bottom of the J being directed toward the corresponding profile strip in order to engage with a further closure element formed in this way.

Such embodiments of closure elements are particularly robust and stable with respect to multiple stresses and furthermore hook together securely until they are released from the hooking engagement. To this end, they can be angled or deflected out of the profile strips in a manner parallel to the throughflow direction.

Hooking connections are also advantageous because they can be used selectively, depending on their orientation. The orientation determines the force direction in which the connection has the greatest strength. If closure elements of a hooking connection are oriented for example in different directions, in particular at angles that are slightly oblique to a plane which is defined perpendicularly to the throughflow direction, the closures can be optimized with regard to corresponding load cases.

In a particularly advantageous embodiment, the actuator is formed such that it can be actuated from outside. Safe actuation from outside is particularly advantageous because the bulk materials contained in the receptacles may be hazardous materials, with which the surroundings of the receptacles must not be contaminated. Actuation from outside also allows a manual method or automation of a docking method in a particularly simple manner.

In a particularly advantageous embodiment, the actuator causes at least one of the closure elements to move so that the engagement thereof in another of the closure elements is released.

The specific movement of individual closure elements ensures that the closures are opened in a particularly safe and controlled manner.

According to an advantageous embodiment, the actuator causes the second closure element and/or the third closure element to move so that the engagement thereof in the associated closure element is released while the engagement of the first closure element of the closure of the first receptacle in the fourth closure element of the closure of the second receptacle remains intact.

Such an actuator can be arranged as a dovetail on the profile strip in a manner facing away from a fastening element to be actuated, for example, the ends of said dovetail, which are formed as gripping elements, being pushed together for actuation purposes.

With this advantageous embodiment, the actuator can trigger a precisely controlled release of the connections between selected closure elements in order to reach an opened docking position. Such an actuator can be particularly easy and yet safe to operate, so that there is no risk to the contents of the receptacles and no risk to the user during docking.

Closures according to the invention offer the possibility of pushing the profile strips of the closures manually into one another or of closing them together. For example, actuators arranged on the outside of the profile strips are formed preferably as tabs. When such a tab is pulled laterally, it causes for example the controlled opening of the receptacles with respect to one another, in order to reach the opened docking position. A lateral pull on another tab causes for example the connections of the closures of two receptacles to be separated from one another, as a rule once the receptacles have been individually closed again.

To this end, use is made preferably of above-described J-shaped closure elements, which open only when force is applied in a critical direction in that the engagement of the closure elements behind one another is released because the closure elements are angled. In another direction, they block the latching profiles. Care is taken here to ensure that force in a critical direction transversely to the throughflow direction is not applied during usual load states, for example during transport. For example, on account of the weight pressure of the bulk material in the receptacle, a lateral pull transversely to the throughflow direction can also act on the latching profiles, but this lateral pull must not open the closure.

In an advantageous embodiment, a slide is used to actuate the actuator, it being possible to move said slide over the width of the receptacles transversely to the throughflow direction. It moves on the profile strips and engages advantageously in the actuators, which are also provided for manual operation, and actuates said actuators in a targeted manner in order to release the connections between selected closure elements, depending on the user's wishes. When it is pushed in the other direction, the slide serves also to close the respective receptacle.

Such slides also increase the degree of safety of the controlled closing and opening of the receptacles.

Advantageously, a slide for sliding on the closure is provided with a U-shaped cross section transversely to a sliding axis. The U-shaped cross section has a base, a first limb and a second limb. The limbs extend in the throughflow direction approximately parallel to the profile strips of the closure. In this case, the first limb, which faces away from the second receptacle, is formed with a gripping portion and the second limb, which faces the second receptacle, is formed with a connecting element and a connecting element holder. The sliding axis extends approximately perpendicularly to the U-shaped cross section in the direction through the slide in which the slide can be moved on the profile strips. Between the limbs and approximately parallel to the sliding axis, a blade is arranged on the base.

Such a slide is advantageously formed to interact with a further slide on a further closure, in that the slide having the connecting element and the connecting element holder has an interface with the further slide, so that controlled connection of the receptacles is configured in an even more secure manner.

In an advantageous embodiment of the slide, the first limb has along the sliding axis a narrow insertion end and a wide channel end opposite the latter.

Such a form of the slide advantageously favors the docking of the closures together, since the limb is optimized for the insertion side of a closure to be inserted into profile strips that are closed together and for the profile strips that are separated from one another by the movement of the slide to be kept apart in a controlled manner by way of the channel end.

In an advantageous embodiment of the slide, the base, which faces away from the gripping portion, is formed, obliquely with respect to the sliding axis and parallel to the throughflow opening, with a step-like wall. The wall merges into the first limb so that the first limb is shorter in the direction of the sliding axis than the second limb.

The shape of the base is formed such that the interface of the slide with the further slide of the further closure is arranged on the outside of the first limb when viewing the U-shaped cross section. When used according to the invention, the first limb is supported by the further slide and can therefore itself be configured to be shorter and moreover narrower in a material-saving manner as described here. The stepped incline, which is formed by the base and the first limb, and an incline, which is executed parallel thereto, on an inner side of the second limb—when viewing the U-shaped cross section—make it easier to push the profile strips into one another for the first time by way of the slide, since the profile strips can be introduced into the slide in an exposed manner on the side of the narrow end. In the course of pushing into one another, the material thickness of the slide becomes ever greater, taking account of the increasing loading of the latter, and so savings of material are achieved with the oblique configuration of the slide.

In an advantageous embodiment of the slide, the slide has a cutter, preferably on the blade. By way of the cutter, bags can simultaneously be separated during the movement of the slide, if for example a completely opened docking position is intended to be achieved not just by means of the closure.

In an alternative variant, the invention also relates to a generic closure as described at the beginning, as well as other generic closures, for example closures having closure elements which are arranged in the throughflow direction. The generic closure comprises in a general manner two profile strips for the environmentally sealed connection of a first receptacle to a second receptacle so that a closed docking position can be taken up, and for the environmentally sealed guidance of a throughflow in a throughflow direction through the closure from the first receptacle into the second receptacle so that an opened docking position can be taken up. In this case, according to the alternative variant of the invention the closure can be adhesively bonded to the respective receptacle. Furthermore, the alternative closure has the above-described slide, with the slide being used to dock the first receptacle to the second receptacle.

While the first variant of the closure is based on the fact that a receptacle is first closed by way of the closure before the closure is then connected to an identical closure, in the alternative variant the receptacle is not closed by way of a closure but, for example, by way of a weld seam. In practice, these are cases that are encountered relatively frequently. The adhesive bonding of a closure to profile strips over the entire width of the receptacle can be executed very easily and securely.

An advantageous embodiment of the alternative closure has closure elements on the profile strips, said closure elements being oriented exclusively approximately transversely to the throughflow direction, wherein the closure elements are intended for mutual engagement in one another.

The advantages of closure elements that are oriented transversely to the throughflow direction have already been described in detail above with regard to the first variant of the closure.

In particular the integration of a cutter into a slide, which is adhesively bonded together with the closure to one of the receptacles, is advantageous particularly when already filled receptacles are intended to be docked, without it being possible for contamination to occur.

Particularly advantageously, the closure according to the first alternative, mentioned in claim 1, of the subject matter of the invention is used according to the invention by means of a method having at least the method steps of:
a. closing the receptacles by way of a respective closure as claimed in claim 1,
b. connecting the closures by laterally pushing the closures together so that corresponding closure elements engage in one another, and
c. actuating the actuator to switch from a closed docking position into an opened docking position.

Such a sequence of a method according to the invention ensures that closures according to the invention are used safely.

BRIEF DESCRIPTION OF THE DRAWINGS

The invention is explained in detail by way of the following figures, in which.

DETAILED DESCRIPTION OF VARIOUS EMBODIMENTS

Figure 1:
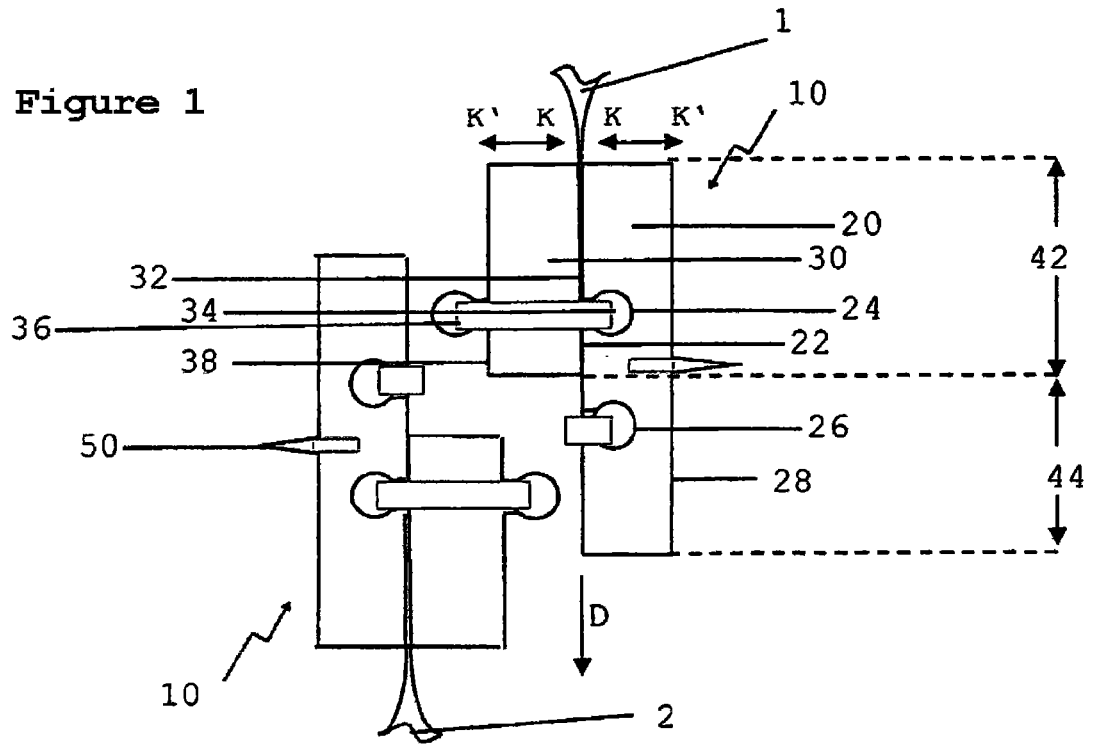
FIG. 1 shows a schematic illustration of a section through a first exemplary embodiment of a closure according to the invention, wherein two receptacles have been closed in each case individually by a respective closure without the closures being connected together.

A first exemplary embodiment of a closure according to the invention is schematically illustrated in FIG. 1. Two identical closures 10 are arranged opposite one another and slightly to the side so that the receptacles 1, 2 that are closed in each case by means of the closures 10 are directed away from one another.

The closure 10 is formed to connect the first receptacle 1 to a second receptacle 2 in an environmentally sealed manner. This can take place by way of the closure 10 being docked with the second closure 10 which is formed in an identical manner. When docked together, the closures 10 can be opened with regard to the receptacles 1, 2 so that a throughflow is guided in an environmentally sealed manner between them in a throughflow direction D. In FIG. 1, the closures 10 have not been docked together, and therefore there is not yet any throughflow in the throughflow direction D.

According to the first exemplary embodiment, the closure 10 according to the invention has a first profile strip 20 and a second profile strip 30. The profile strips 20, 30 are arranged parallel to one end of the receptacle 1, surrounding the walls thereof, and parallel to one another.

The first profile strip 20 is formed to be longer in the throughflow direction D than the second profile strip 30. In a first contact region 42, the profile strips are arranged opposite one another and enclose the receptacle 1 between one another there. By way of a second contact region 44, the first profile strip 20 extends beyond the second profile strip 30 in the throughflow direction D.

The first profile strip 20 has, on a first inner side facing the receptacle 1, a first and a second closure element 24, 26. In this case, the closure elements 24, 26 are provided transversely to the throughflow direction D in order to interact with opposite closure elements, which are likewise oriented transversely to the throughflow direction D.

The second profile strip 30 has, on a second inner side 32 facing the receptacle 1, a third closure element 34, which is oriented transversely to the throughflow direction D.

Formed on an outer side 38, which faces away from the receptacle 1, and likewise transversely to the throughflow direction D, but directed toward the outside, is a fourth closure element 36.

The inner sides 22, 32 and the outer side 38 are formed as contact surfaces with respect to one another.

In the first contact region 42, a connection between the second and the third closure element 24, 34 is thus produced, and so the first receptacle 1 is closed therein. In this case, the second and the third closure element 24, 34 engage in one another.

Provided in the second contact region 44 is a connection between the first and fourth closure element 26, 36 of two identical closures 10.

Such identical closures 10 and such profile strips 20, 30 can be produced in a particularly cost-effective manner as material supplied by the meter, and in particular can be extruded from plastic.

On a first outer side 28 of the first profile strip 20 an actuator 50 is formed approximately between the first contact region 42 and the second contact region 44. The actuator 50 can be actuated to switch from a closed docking position into an opened docking position when the closures 10 are connected together, this not being illustrated here. To this end, the actuator 50 acts on the corresponding closure elements 24, 34 of the closure.

Figure 2:
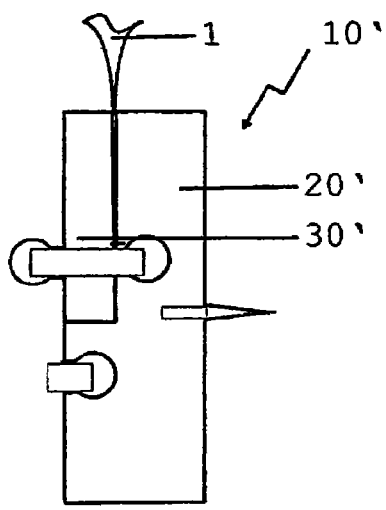
FIG. 2 shows a schematic illustration of a section through a second exemplary embodiment of a closure, wherein a receptacle is illustrated in a manner closed by way of the closure.
Figure 3:
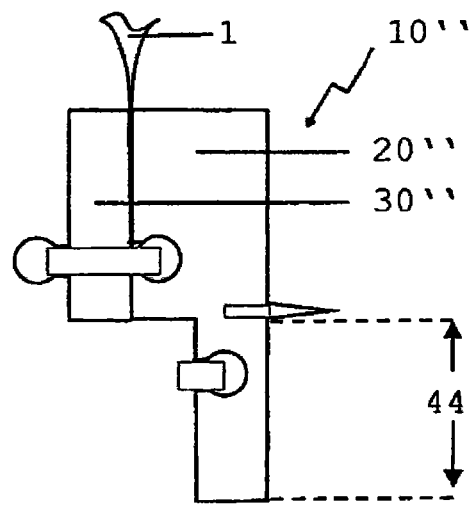
FIG. 3 shows a schematic illustration of a section through a third exemplary embodiment of a closure, wherein a receptacle is illustrated in a manner closed by way of the closure.
Figure 4:
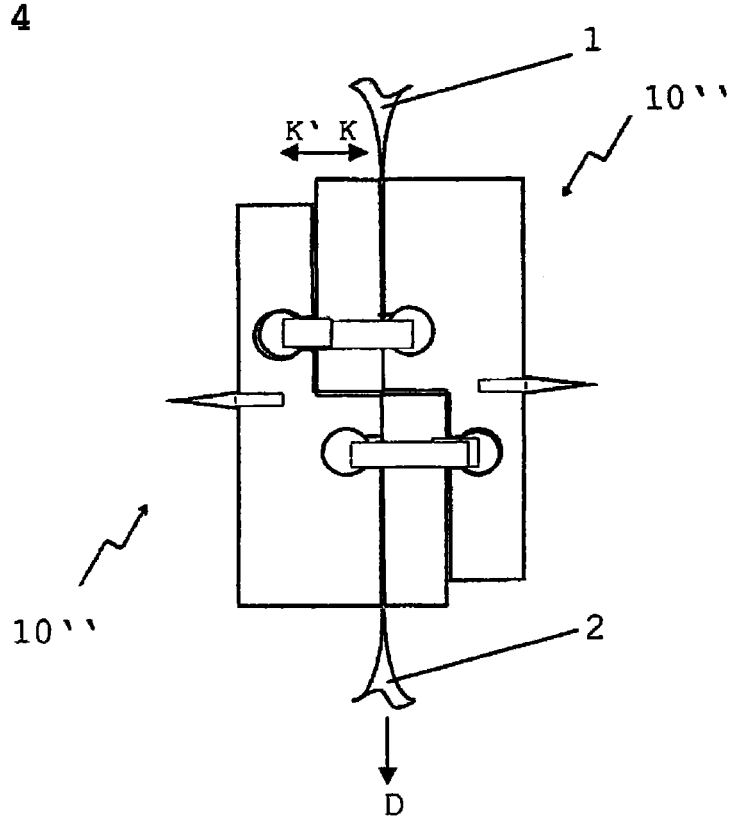
FIG. 4 shows a schematic illustration of a section through two closures according to FIG. 3, said closures closing in each case one receptacle, wherein the closures are connected together and so a closed docking position is illustrated.
Figure 5:
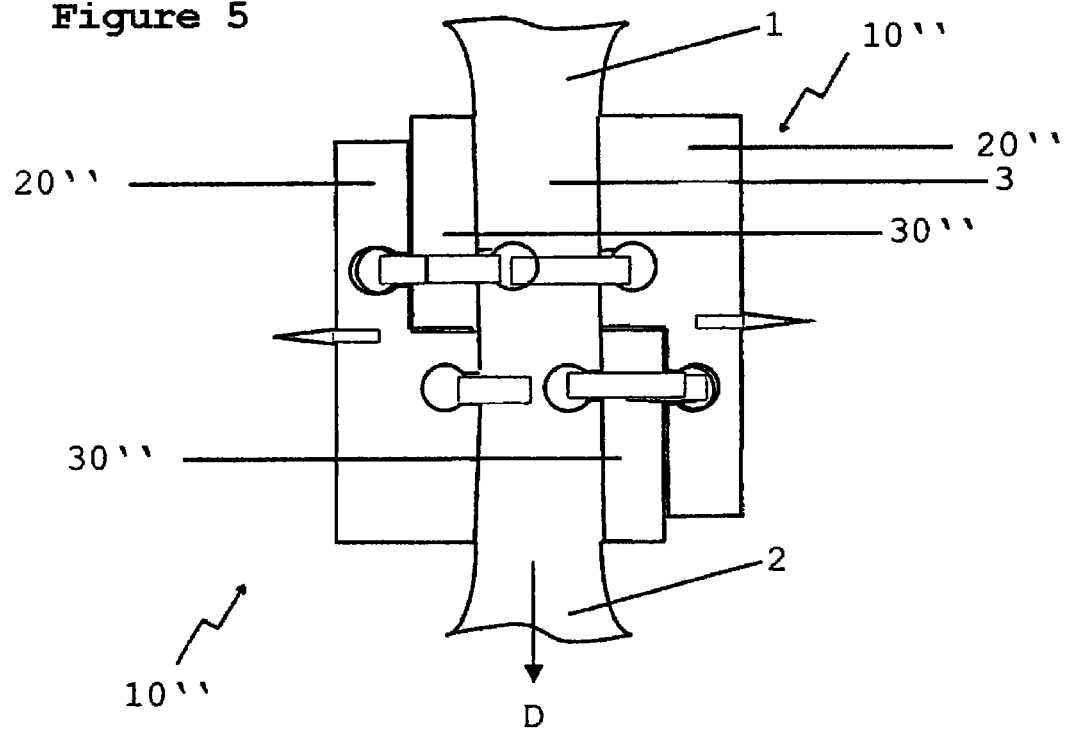
FIG. 5 shows a schematic illustration of a section through the closures from FIG. 4, through which a throughflow can flow from the first receptacle into the second, and so an opened docking position is illustrated.
Figure 6:
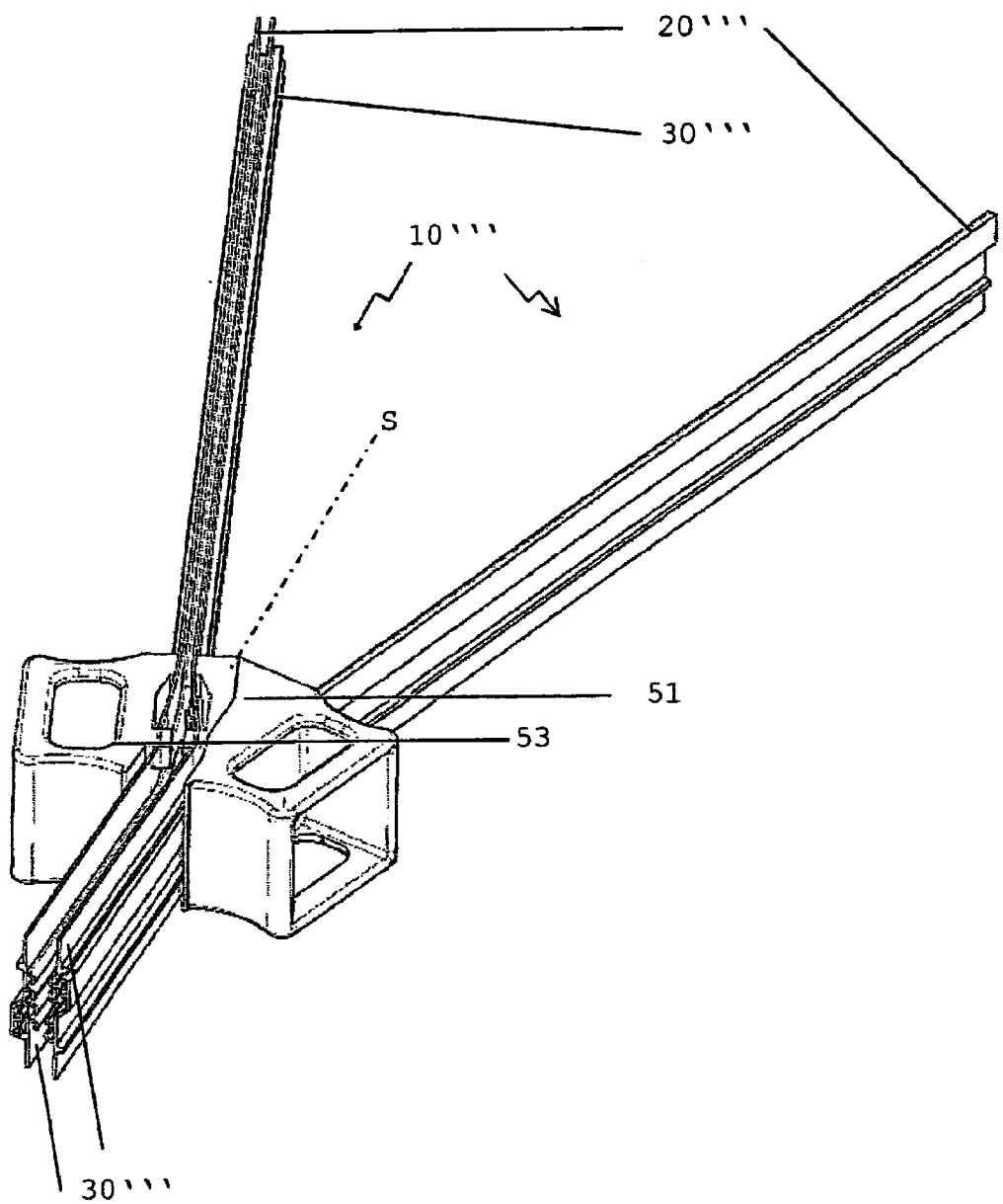
FIG. 6 shows a perspective illustration of two closures, which have been transferred into an opened docking position by two slides that are connected together, according to a fourth exemplary embodiment.

FIG. 2 shows a second exemplary embodiment and FIG. 3 a third exemplary embodiment of closures 10', 10" according to the invention. In this case, according to FIG. 2 the profile strips 20', 30' of the closure 10' are formed such that, when they are connected together, and as seen in cross section, they form an approximate rectangle. According to FIG. 3, it is alternatively provided that the first profile strip 20" is configured in a narrower manner in the second contact region 44 than in the first contact region 42, and in particular has a shoulder. In addition to being shown in FIG. 3, the closure 10" of the third exemplary embodiment is also illustrated in FIGS. 4 and 5 in a closed docking position (FIG. 4) and an opened docking position (FIG. 5).

Figure 8:
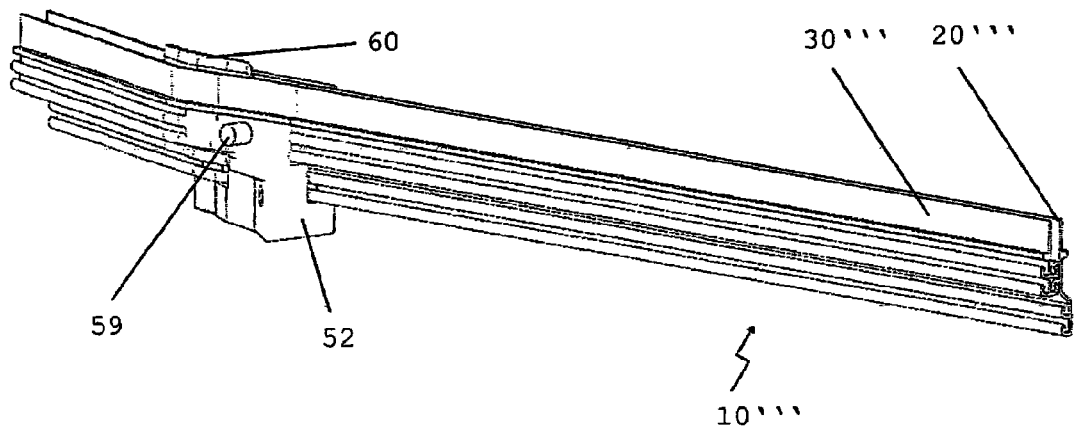
FIG. 8 shows a further perspective view of the closure with the slide according to FIG. 7 following rotation through 180°.
Figure 9:
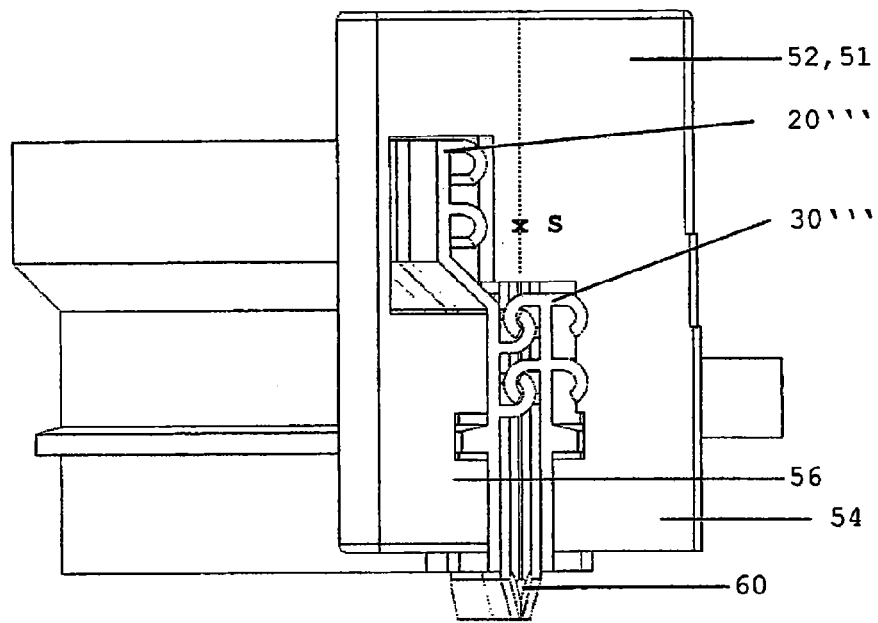
FIG. 9 shows a perspective view of the closure with the slide, wherein the slide is illustrated in a position at one end of the closure, once the slide has been pushed along the sliding axis in order to reach the opened docking position at this end.
Figure 10:
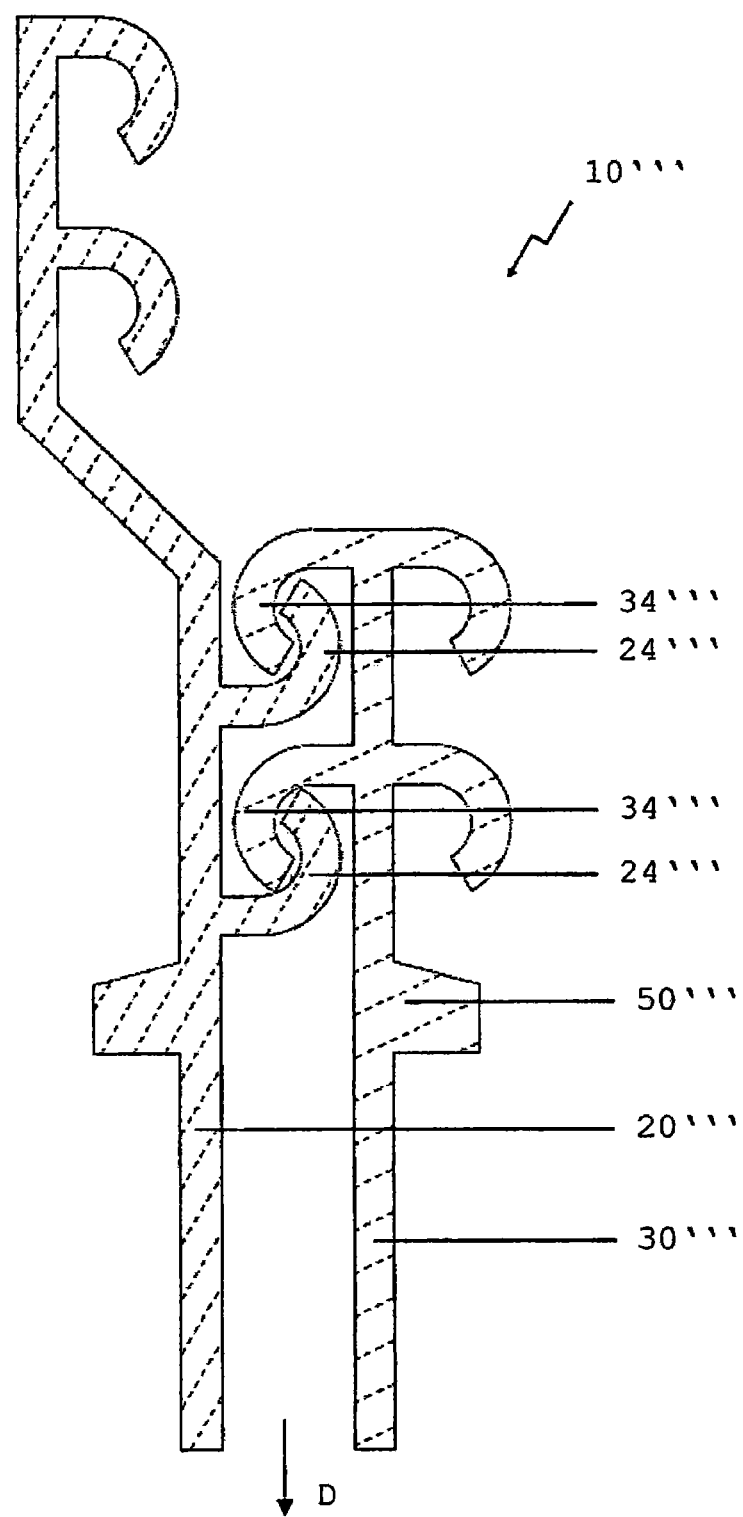
FIG. 10 shows a section through the closure according to FIGS. 6 to 9 without a slide, with profile strips engaging in one another.
Figure 11:
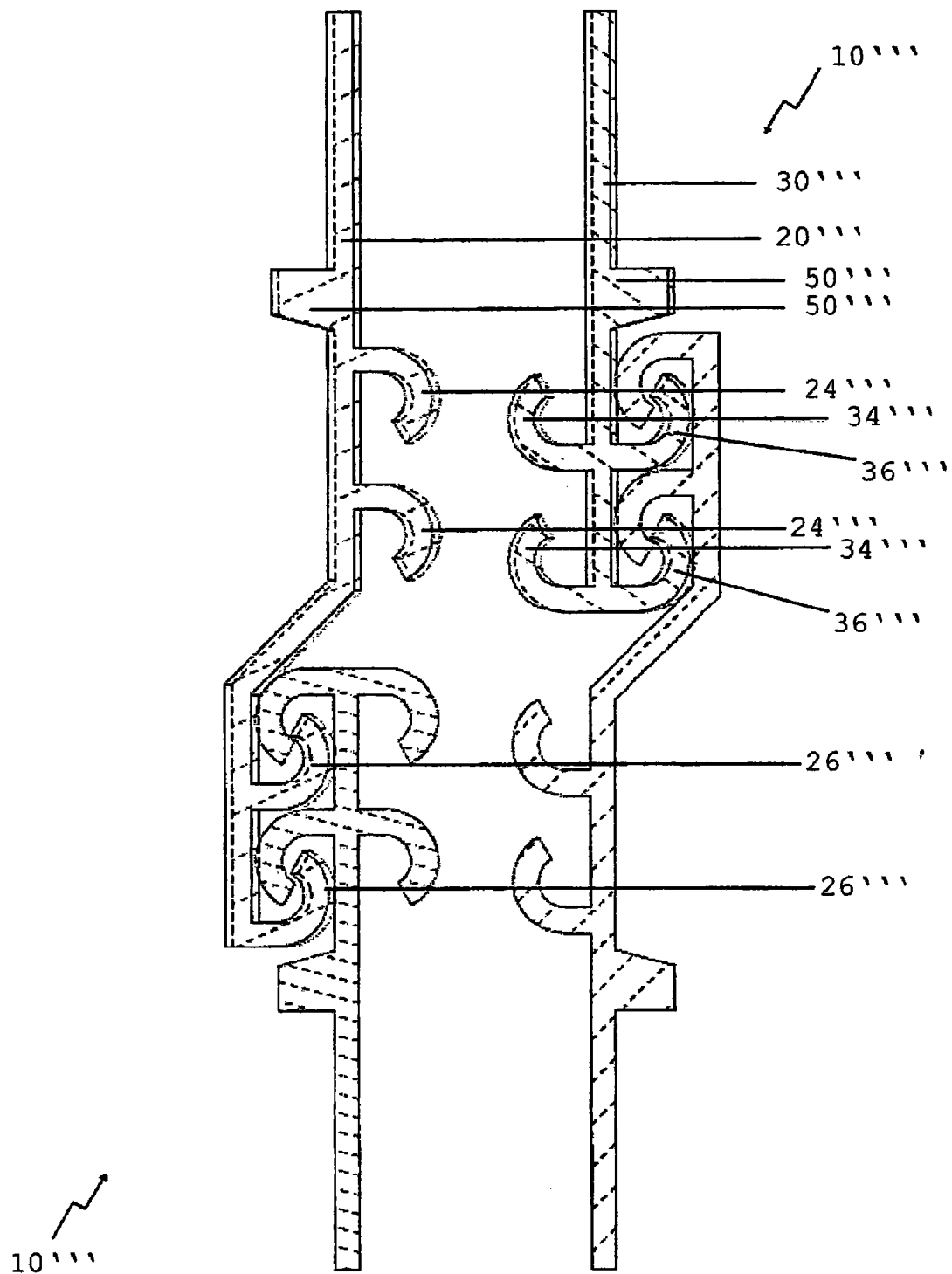
FIG. 11 shows a section through two closures according to the fourth exemplary embodiment in FIGS. 6 to 10 in an opened docking position, wherein the movement of the closure elements, which can be triggered by the actuator, is indicated by way of double curved lines on closure elements.
Figure 12:
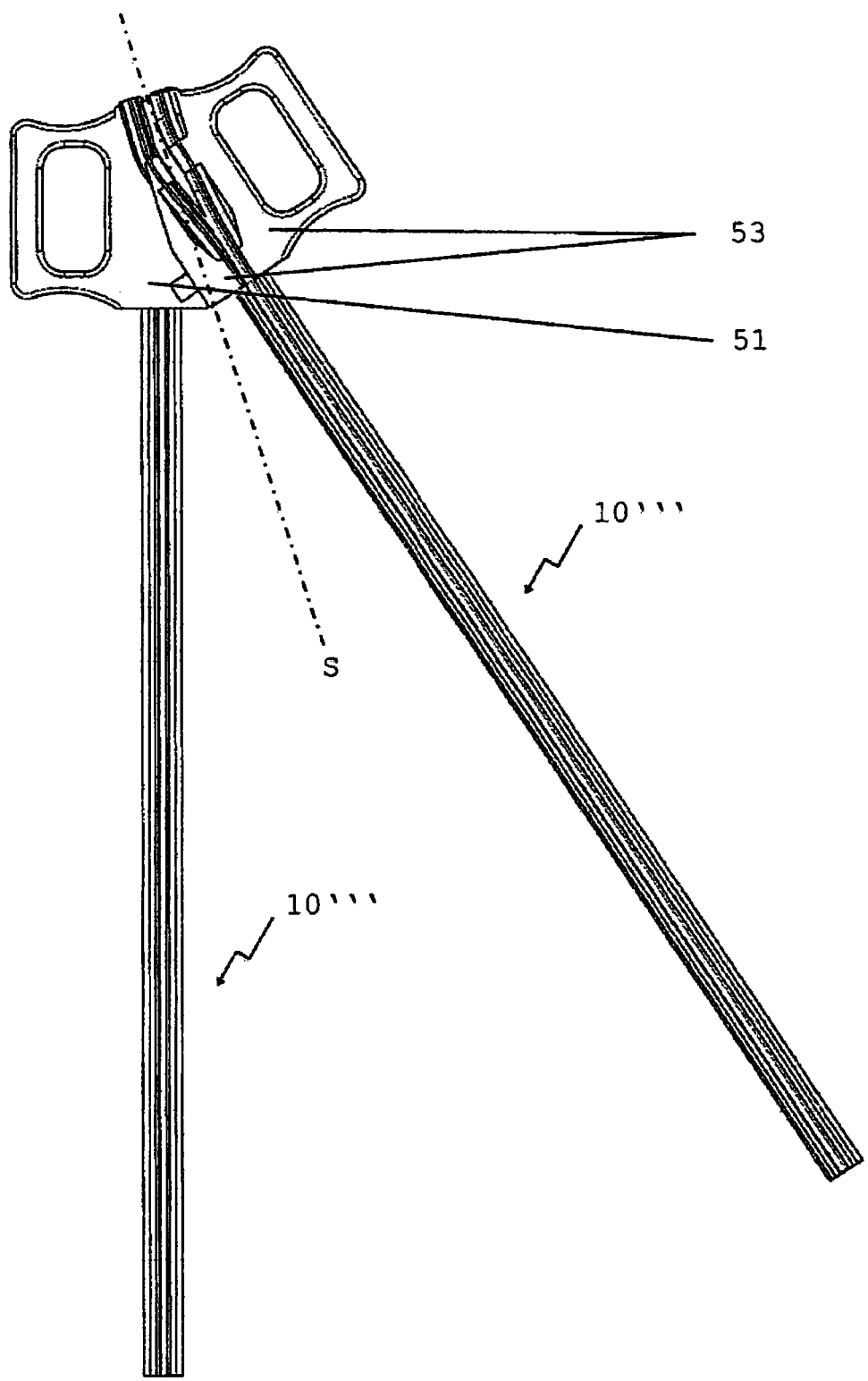
FIG. 12 shows a perspective illustration according to FIG. 9 as seen in the throughflow direction.
Figure 13:
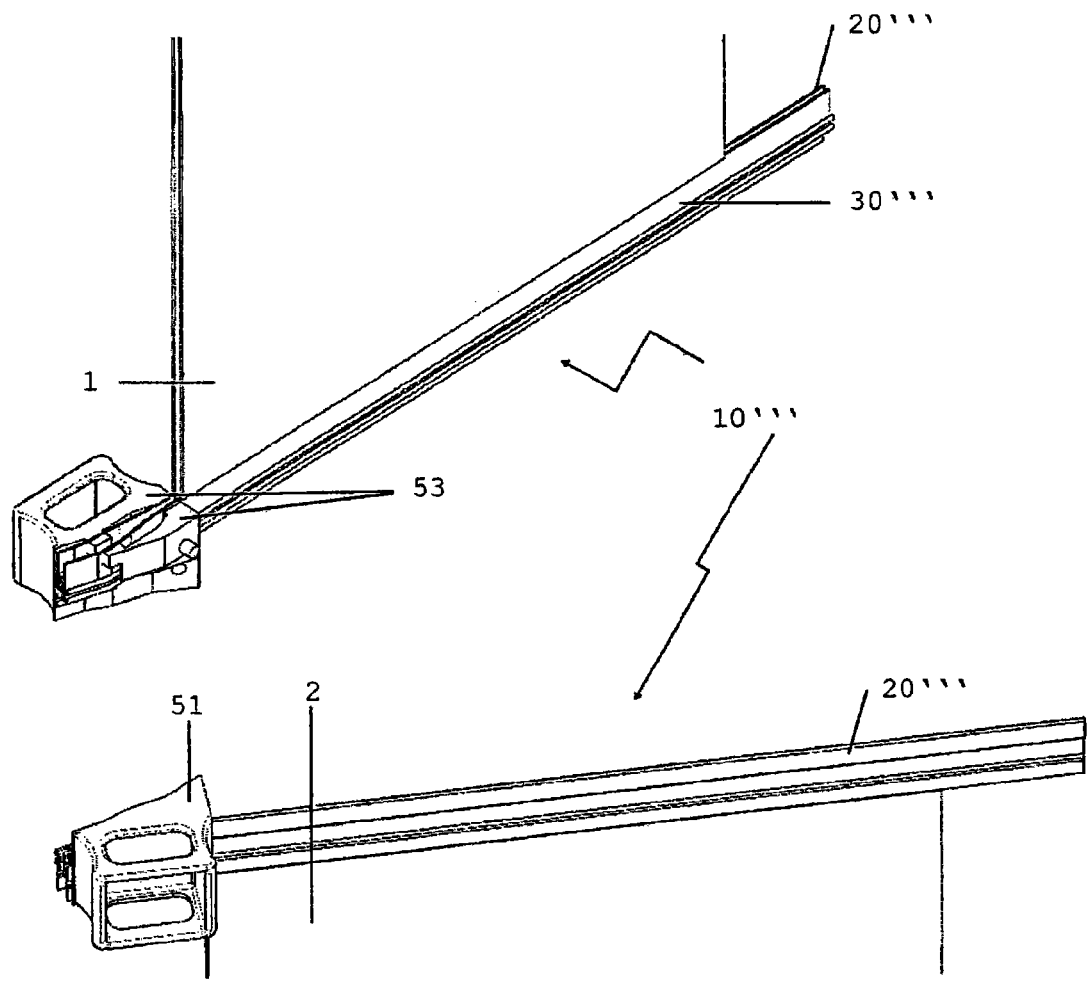
FIG. 13 shows a perspective illustration of two receptacles which are closed by closures according to the fourth exemplary embodiment and which are prepared to be pushed together laterally by means of two slides.
Figure 14:
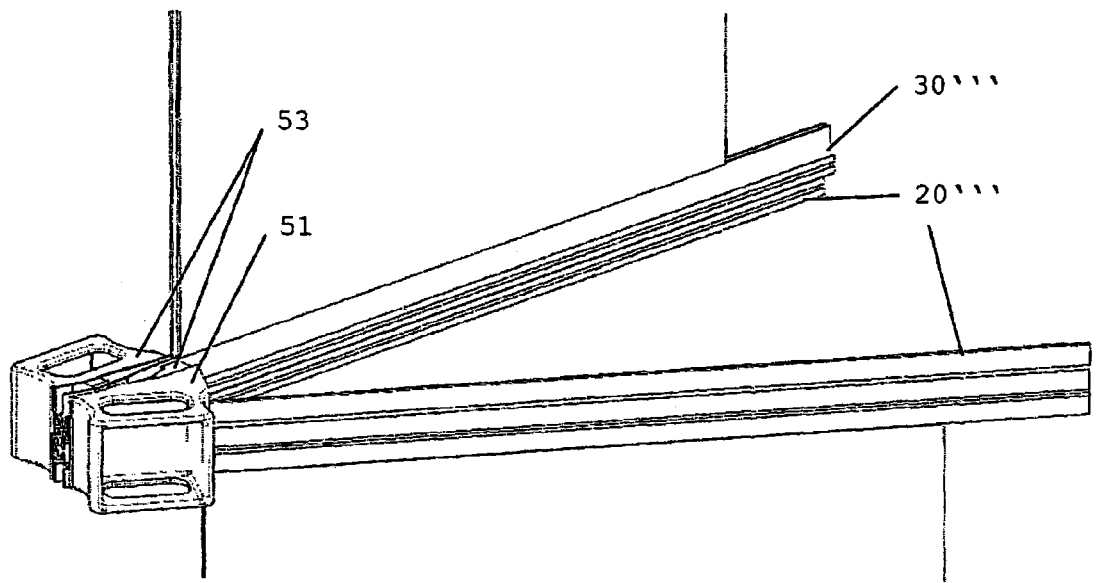
FIG. 14 shows a perspective illustration of two receptacles having closures according to FIG. 13, wherein the slides have been connected together.
Figure 15:
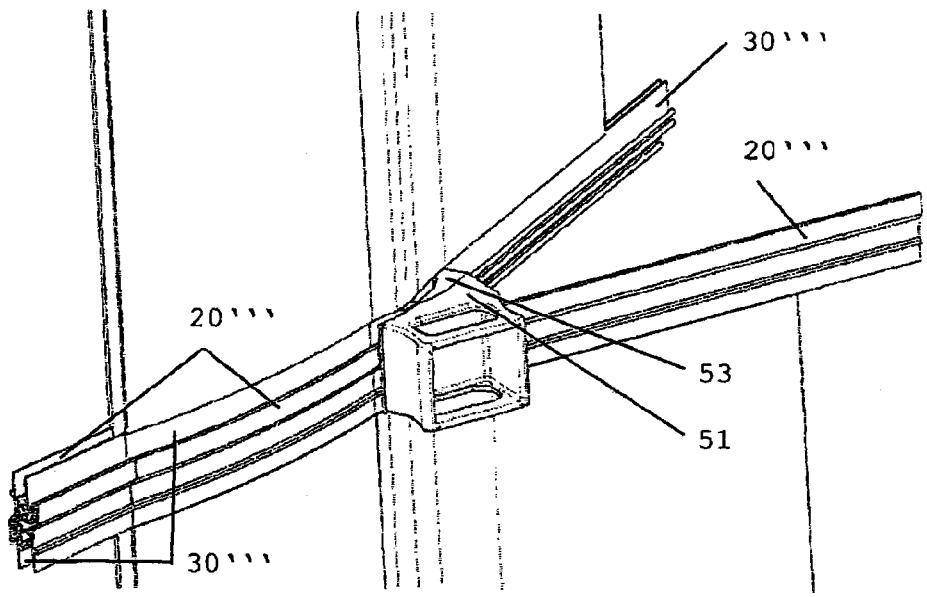
FIG. 15 shows a perspective illustration according to FIG. 14, wherein the slides has been pushed along the sliding axis approximately as far as the middle of the profile strips and so an already partially opened docking position is illustrated.
Figure 16:
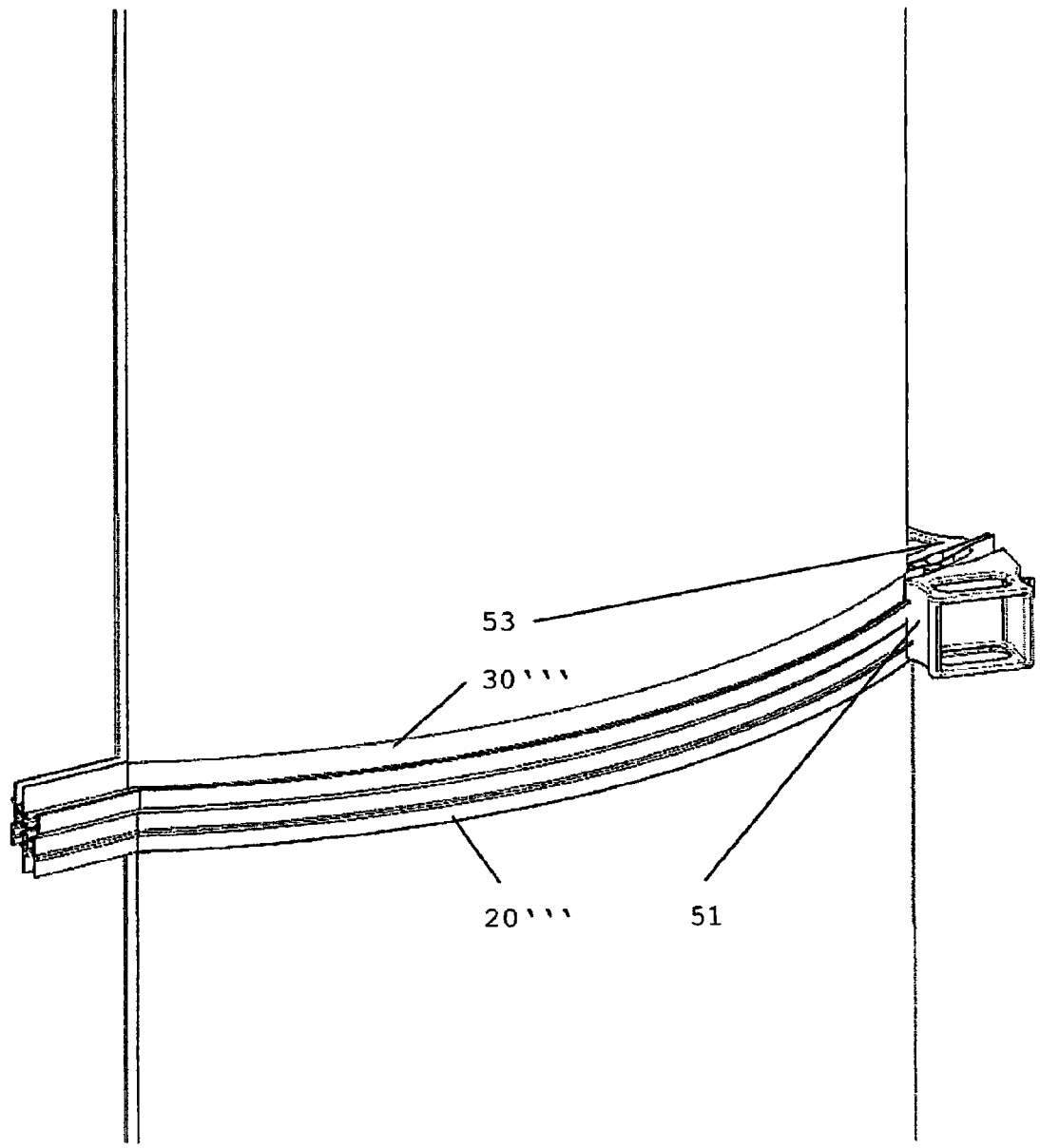
FIG. 16 shows a perspective illustration of the receptacles from FIG. 14, wherein the slides have been pushed along the sliding axis over the entire width of the receptacles, and so the channel created between the receptacles by the closures extends virtually over the entire width of the receptacles.

FIGS. 6 to 16 illustrate a fourth exemplary embodiment. FIGS. 10 and 11 illustrate sections through a closure 10'''.

FIG. 10 illustrates a section through a closure 10''' which is closed with its profile strips 20''', 30'''. The profile strips 20''' and 30''' have, facing away from one another and in each case directed toward the outside, transversely to the throughflow direction D, an actuator 50''', the function of which—and also the other functions of the profile strips 20''', 30'''—is comparable to the function according to exemplary embodiments 1 to 3. On the profile strips 20''' and 30''', closure elements 24''', 34''' are arranged in a manner directly facing one another.

Figure 17:
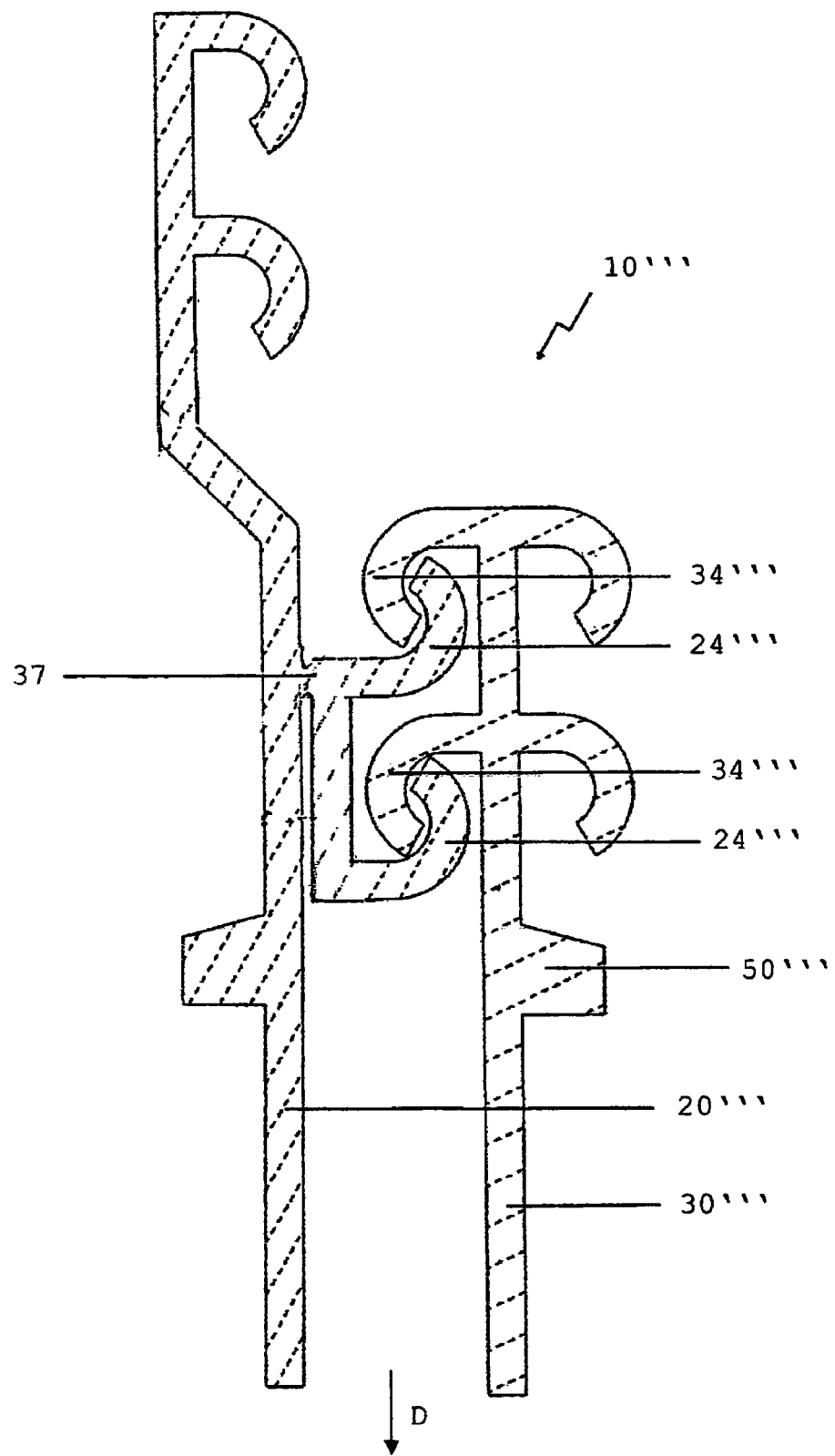
FIG. 17 shows a section through a further variant of the closure from FIG. 10 having a film hinge arranged between one of the profile strips and closure elements of the profile strips.
Figure 18:
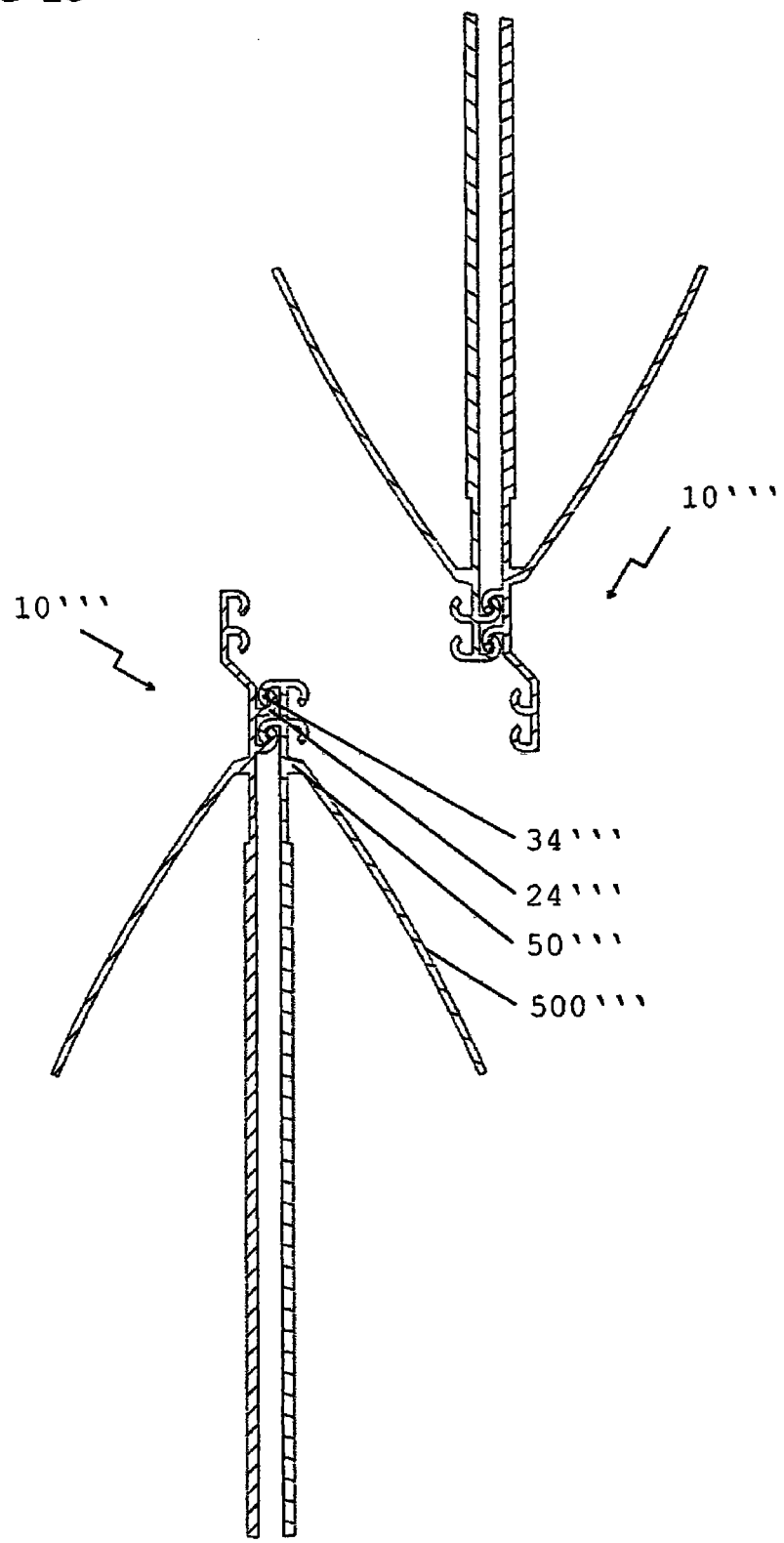
FIG. 18 shows a section through a further variant of the closure from FIG. 10 with gripping elements for manually actuating the actuator, wherein two receptacles are each closed individually by a respective closure of this type without the closures being connected together.
Figure 19:
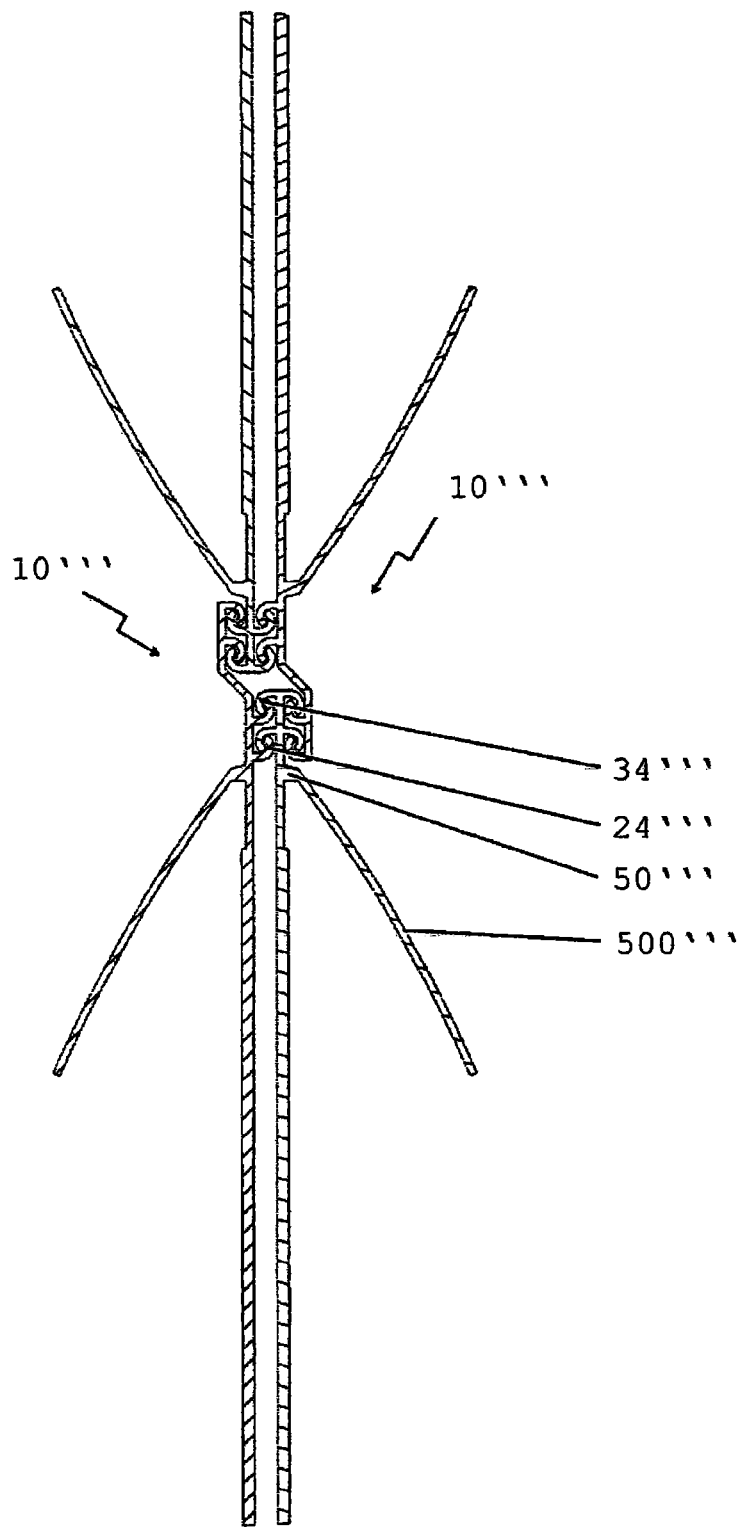
FIG. 19 shows a section through the closures from FIG. 18, wherein the closures have been connected together in the closed docking position.

A modification of this embodiment is illustrated in FIG. 17. Parallel to the first profile strip 20''', a secondary strip is fastened to the first profile strip 20' via a film hinge 37. In this modification, the first profile strip 20''' carries the closure elements 24' not directly, but rather indirectly. Specifically, the closure elements 24" are arranged on the secondary strip. Thus, even in filled receptacles 1, 2, peeling off of the closure elements 24', 34" is avoided when the contents bend the profile strips 20''', 30''' toward one another. The film hinge 37 decouples the closure elements 24', 34" from the profile strip 20'''. The closure profile strips 20''', 30''' can yield to the loads without the closure elements 24''', 34''' releasing.

Figure 20:
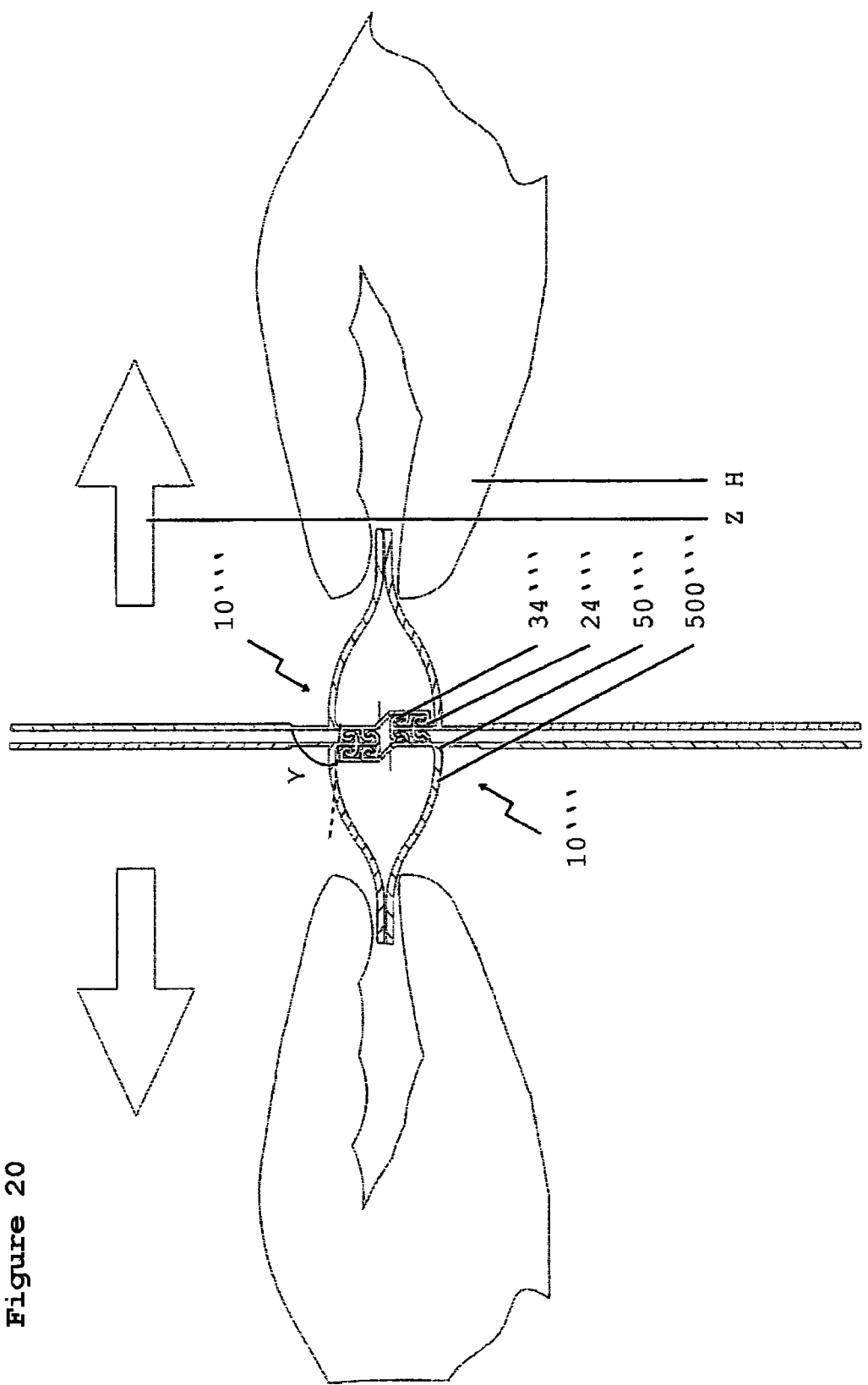
FIG. 20 shows a section through the closures from FIG. 19 having manually actuated actuators.
Figure 21:
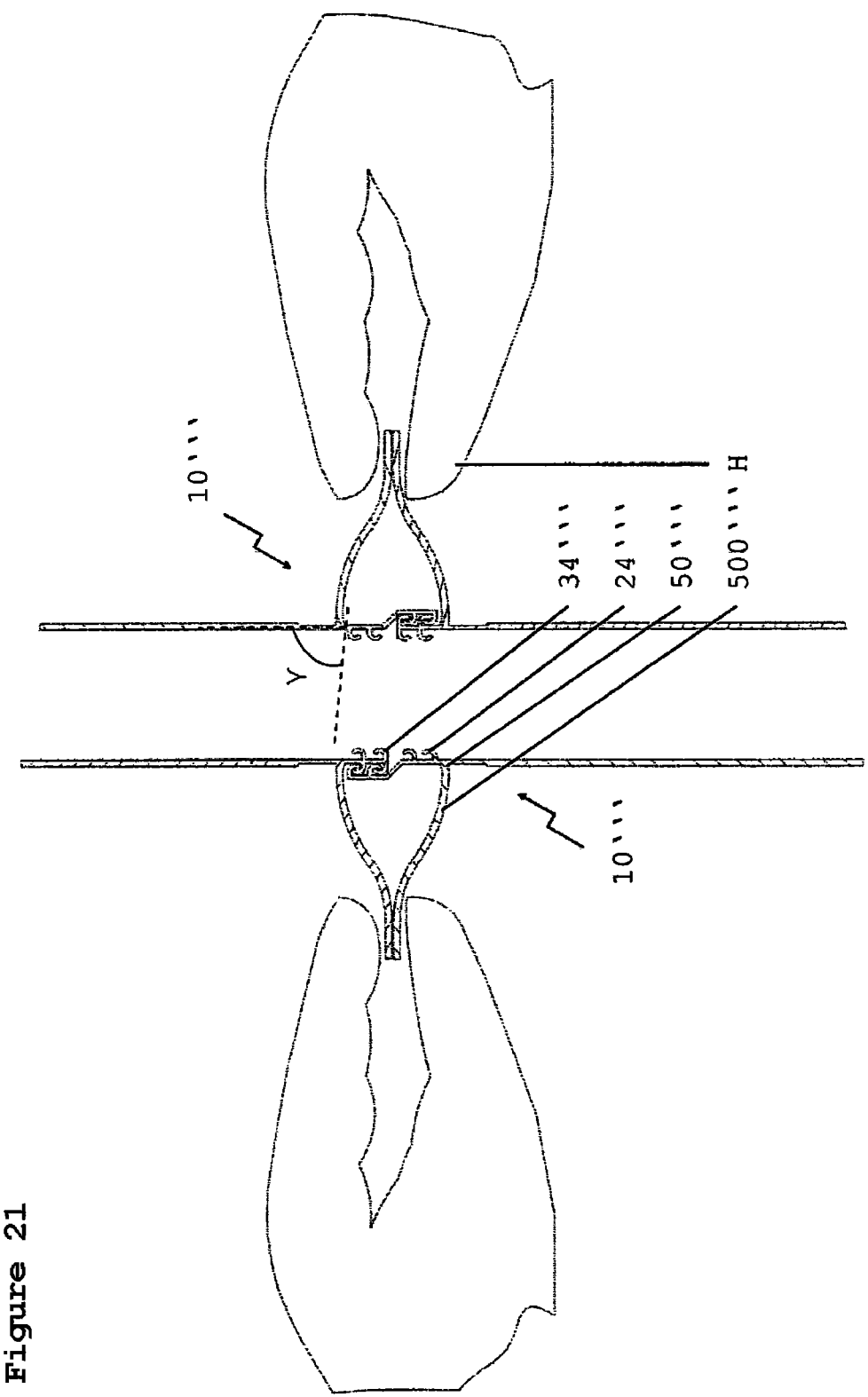
FIG. 21 shows a section through the closures from FIG. 19 following switching into the opened docking position.

FIGS. 18 to 21 illustrate a gripping element 500''' attached to the actuator 50'''. In other words, the actuator is configured as a gripping element 500'''. As illustrated in FIGS. 20 and 21 with a hand H, the gripping element 500''' can be grasped by the hand H. In the closed docking position (FIGS. 19 and 20), the gripping elements 500''' of the closures 10''', which are docked together, are gripped by the hands H on both sides of the receptacles (not illustrated here) and forced together as close as possible to the closures 10'''.

The associated deflection of the gripping elements 500" affects the closure elements 24''' and/or 34''' in a manner mediated via the actuator 50'''. The closure elements 24''' and/or 34''' are deflected in an angle γ. Whether both closure elements 24''' and 34''' or only one of the closure elements is affected by the respective actuator 50''' depends on the functioning thereof. If the deflection of one of the closure elements is sufficient, a deflection of the closure element engaging in each case opposite the latter may not be necessary.

In FIG. 20, arrows indicate that the hands H pull on the gripping elements 500''' in a pulling direction Z when said gripping elements 500"" are pushed together. The deflection by the angle γ alone is not sufficient in some embodiments to enable a switch from the closed docking position into the opened docking position. Only by means of the additional pull are the closure elements 24''', 34''' released sufficiently.

In FIG. 11, two closures 10''' are located in an opened docking position with respect to one another. In this case, double lines illustrate the effect of the actuation of the actuator 50" on the profile strips 20''', 30'''. By actuation of the actuator 50''', the closure elements 24''', 26''', 34', 36''' arranged on the profile strips 20''', 30', illustrated by angling or deflection, release the engagement with the opposite closure elements.

FIGS. 6 and 12 to 16 illustrate the interaction of two slides 51, 53 for the closures 10''' in a perspective manner. In this case, a first slide 51 is pushed onto a partially closed closure 10''' and a second slide 53 is pushed onto a second closure 10'''. The slides 51, 53 are connected together and are moved together on the profile strips 20''', 30''' along a sliding axis S. On one side of the slides 51, 53 which are connected together, the closures 10''' are in an opened docking position, while on the other side of the slides 51, 53 the closures 10''' of the two receptacles to be connected together are located to the sides of one another and are closed in each case separately from one another.

Figure 7:
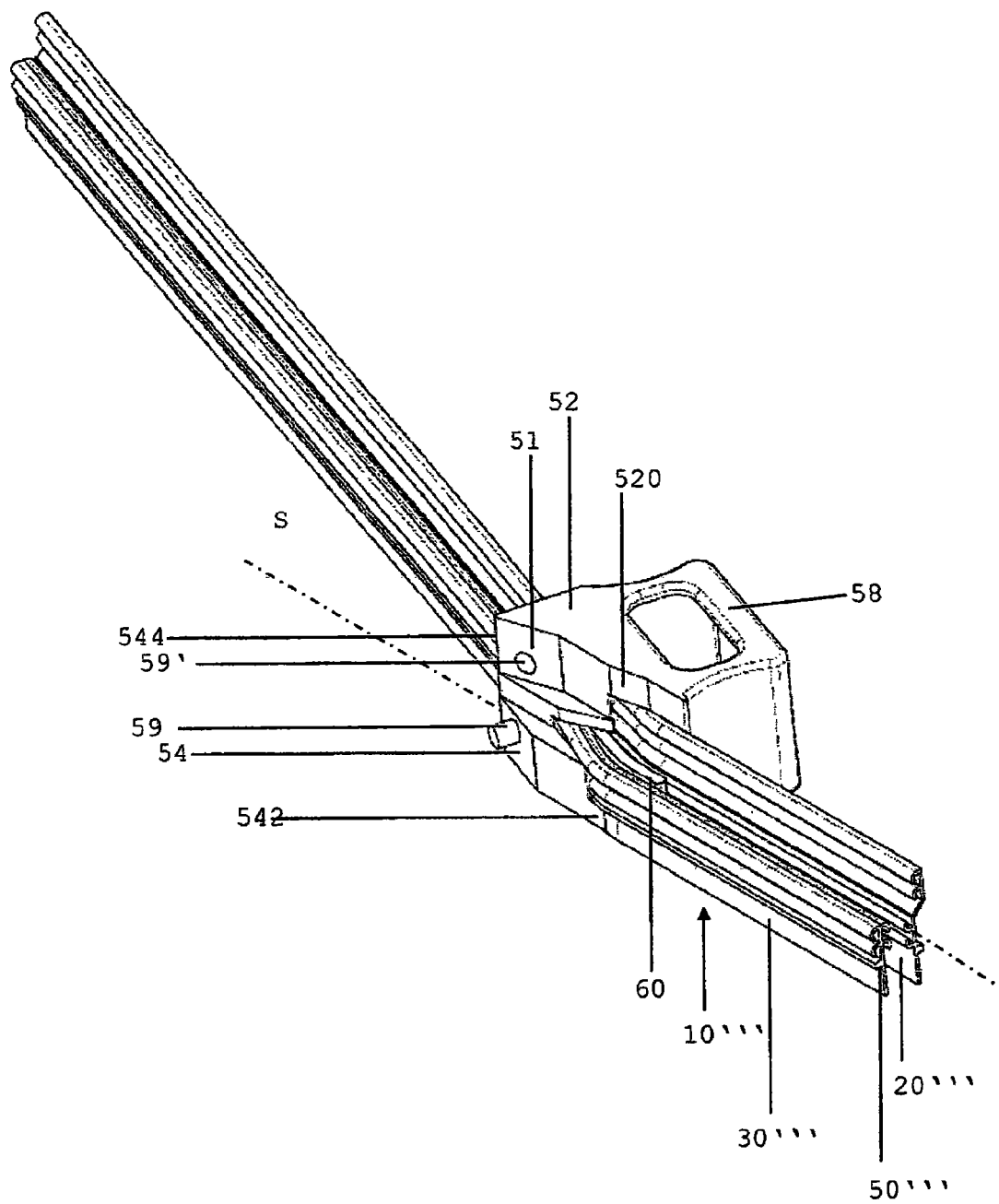
FIG. 7 shows a perspective view of the fourth exemplary embodiment according to FIG. 6, wherein only one closure having the associated slide is illustrated.

FIGS. 7 to 9 illustrate the slide 51 separately, and in principle the two slides 51, 53 are formed in an identical manner, for which reason the description of the slide 51 can be applied in the same way to the slide 53.

As seen in cross section, the slide 51 is formed in a U-shaped manner. The cross section of the slide 51 has a base 52 and two limbs 54, 56. The closure 10''' is held inside the U-shaped cross section.

The base 52 is formed, in a manner crossing the held closure 10''', with a wall 520, wherein the wall 520 merges into a first limb 54. In this case, the wall 520 crosses the closure 10''' in steps having different inclinations with respect to the sliding axis S. The first limb 54 has—as seen along the sliding axis S—a narrow insertion end 542 and, opposite the insertion end 542, a wide channel end 544. The slide 51 holds profile strips 20''', 30''' that are not connected together initially in a loose manner. To this end, the profile strips 20''', 30''' slide into the slide 51 and are pushed together there.

The shaping of the base 52 produces a first limb 54 that is shorter in the direction of the sliding axis S compared with a longer second limb 56. The profile strips 20''', 30''' are guided by the limbs 54, 56 along the steps transversely and also parallel to the sliding direction S, and so a connection between the profile strips 20''', 30''' can be produced or can be separated by the insertion of the blade 60.

Facing the second slide 53, the first limb 54 of the first slide 51 has a connecting element 59 and a connecting element holder 59'. The connecting element 59 and the connecting element holder 59' ensure a defined orientation of the slides 51, 53 with respect to one another.

FIGS. 13 to 16 show perspective illustrations of the transfer from a closed docking position into an opened docking position, the receptacles 1 and 2 to be connected together additionally being illustrated. Here too, two slides 51, 53 are connected together for switching. Alternatively, the same result could be achieved even without the use of the slides 51, 53 by the hands laterally pulling or angling the actuators 50'''.

LIST OF REFERENCE SIGNS

1 First receptacle
2 Second receptacle
3 Channel
10, 10', 10'', 10''' Closure
20, 20', 20'', 20''' First profile strip
22 First inner side
24, 24''' Second closure element
26, 26''' First closure element
28 First outer side
30, 30', 30'', 30''' Second profile strip
32 Second inner side
34, 34''' Third closure element
36, 36''' Fourth closure element
37 Film hinge
38 Second outer side
42 First contact region
44 Second contact region
50, 50''' Actuator
51 First slide
52 Base
53 Second slide
54 First limb
56 Second limb
58 Gripping portion
59 Connecting element
59' Connecting element holder
60 Blade
500''' Gripping element
520 Wall
542 Insertion end
544 Channel end
γ Deflection angle
D Throughflow direction
H Hand
K Inward direction with respect to the channel
K' Outward direction with respect to the channel
S Sliding axis
Z Pulling direction

The invention claimed is:

1. A closure, comprising:
two profile strips for an at least partially flexible receptacle for the environmentally sealed connection of a first receptacle to a second receptacle in a closed docking position and for the environmentally sealed guidance of a throughflow in a throughflow direction through the closure from the first receptacle into the second receptacle in an opened docking position,
wherein the second receptacle has an identical closure facing the first receptacle, said identical closure being engaged with the closure of the first receptacle in the opened docking position and forming, together with the closure of the first receptacle, a channel for the throughflow in the throughflow direction,
wherein the profile strips arranged opposite one another close the respective receptacle in a manner held between one another,
wherein a first profile strip extends in the throughflow direction beyond the respective receptacle and the first profile strip is formed with at least one first and one second closure element on a first inner side facing the respective receptacle and all of the closure elements are arranged exclusively in a manner oriented transversely to the throughflow direction and in the inward direction with respect to the channel,
wherein a second profile strip is formed with at least one third closure element on a second inner side facing the respective receptacle, wherein the at least one third closure element is arranged in a manner oriented transversely to the throughflow direction and in the inward direction with respect to the channel, and is formed with at least one fourth closure element on an outer side facing away from the respective receptacle, wherein the at least one fourth closure element is arranged exclusively in a manner oriented transversely to the throughflow direction and in the outward direction with respect to the channel,
wherein the inner side of the first profile strip has in the throughflow direction a first contact region and a second contact region,
wherein the second and the third closure element close the first receptacle in the first contact region, in which the second closure element and the third closure element engage in one another,
wherein the second contact region extends beyond the first receptacle and the opposite second profile strip, and
wherein the closure of the first receptacle can be connected in the second contact region to the identical closure of the second receptacle, in that the first closure element of the closure and the fourth closure element of the identical closure engage in one another.

2. The closure as claimed in claim 1, wherein the inner sides and the outer side are formed as contact surfaces in particular in a congruent manner with respect to one another.

3. The closure as claimed in claim 1, wherein the closure elements engage in one another in the manner of a groove-spring connection or a hooking connection.

4. The closure as claimed in claim 1, wherein the closure has at least one actuator, which is suitable for transferring the closure from the closed docking position into the opened docking position and which is formed such that the at least one actuator can be actuated from outside.

5. The closure as claimed in claim 4, wherein the at least one actuator causes at least one of the closure elements to move so that the engagement thereof in another of the closure elements is released.

6. The closure as claimed in claim 4, wherein the at least one actuator causes the second closure element or the third closure element to move so that the engagement thereof in the respectively associated closure element is released while the engagement of the first closure element of the closure in the fourth closure element of the identical closure remains intact.

7. The closure as claimed in claim 4, wherein the at least one actuator is formed such that the at least one actuator can be actuated by way of a slide, wherein the slide can be moved on the profile strips over the width of the receptacles transversely to the throughflow direction.

8. A method for the environmentally sealed connection of a first receptacle to a second receptacle in a closed docking position and for the environmentally sealed guidance of a throughflow in a throughflow direction through the closure from the first receptacle into the second receptacle in an opened docking position, the method comprising:
  closing the receptacles by way of respective closures of each of the receptacles;
  connecting the closures by laterally pushing the closures together so that corresponding closure elements engage in one another; and
  actuating an actuator to switch from the closed docking position into the opened docking position,
  wherein each of the respective closures includes two profile strips for the environmentally sealed connection of the first receptacle to the second receptacle in the closed docking position and for the environmentally sealed guidance of a throughflow in a throughflow direction from the first receptacle into the second receptacle in the opened docking position,
  wherein the respective closure of the first receptacle is a first closure, and wherein the respective closure of the second receptacle is an identical closure facing the first receptacle, said identical closure being engaged with the first closure of the first receptacle in the opened docking position and forming, together with the first closure of the first receptacle, a channel for the throughflow in the throughflow direction,
  wherein the profile strips arranged opposite one another close the respective receptacle in a manner held between one another,
  wherein a first profile strip extends in the throughflow direction beyond the respective receptacle and the first profile strip is formed with at least one first and one second closure element on a first inner side facing the respective receptacle and all of the closure elements are arranged exclusively in a manner oriented transversely to the throughflow direction and in the inward direction with respect to the channel,
  wherein a second profile strip is formed with at least one third closure element on a second inner side facing the respective receptacle, wherein the at least one third closure element is arranged in a manner oriented transversely to the throughflow direction and in the inward direction with respect to the channel, and is formed with at least one fourth closure element on an outer side facing away from the respective receptacle, wherein the at least one fourth closure element is arranged exclusively in a manner oriented transversely to the throughflow direction and in the outward direction with respect to the channel,
  wherein the first inner side of the first profile strip has in the throughflow direction a first contact region and a second contact region,
  wherein the second and the third closure element close the first receptacle in the first contact region, in which the second closure element and the third closure element engage in one another,
  wherein the second contact region extends beyond the first receptacle and the opposite second profile strip, and
  wherein the first closure of the first receptacle can be connected in the second contact region to the identical closure of the second receptacle, in that the first closure element of the closure and the fourth closure element of the identical closure engage in one another.

9. A closure system, comprising:
  at least one closure; and
  a slide for the at least one closure, said slide being suitable for connecting a first receptacle and a second receptacle laterally together by way of the at least one closure and/or for closing a respective one of the receptacles,
  wherein the at least one closure includes two profile strips for the environmentally sealed connection of the first receptacle to the second receptacle in a closed docking position and for the environmentally sealed guidance of a throughflow in a throughflow direction through the at least one closure from the first receptacle into the second receptacle in an opened docking position,
  wherein the at least one closure includes a first closure, and wherein the second receptacle has an identical closure facing the first receptacle, said identical closure being engaged with the first closure of the first receptacle in the opened docking position and forming, together with the first closure of the first receptacle, a channel for the throughflow in the throughflow direction,
  wherein the profile strips arranged opposite one another close the respective receptacle in a manner held between one another,
  wherein a first profile strip extends in the throughflow direction beyond the respective receptacle and the first profile strip is formed with at least one first and one second closure element on a first inner side facing the respective receptacle and all of the closure elements are arranged exclusively in a manner oriented transversely to the throughflow direction and in the inward direction with respect to the channel,
  wherein a second profile strip is formed with at least one third closure element on a second inner side facing the respective receptacle, wherein the at least one third closure element is arranged in a manner oriented transversely to the throughflow direction and in the inward direction with respect to the channel, and is formed with at least one fourth closure element on an outer side facing away from the respective receptacle, wherein the at least one fourth closure element is arranged exclusively in a manner oriented transversely to the throughflow direction and in the outward direction with respect to the channel,
  wherein the first inner side of the first profile strip has in the throughflow direction a first contact region and a second contact region,
  wherein the second and the third closure element close the first receptacle in the first contact region, in which the second closure element and the third closure element engage in one another,
  wherein the second contact region extends beyond the first receptacle and the opposite second profile strip, and
  wherein the first closure of the first receptacle can be connected in the second contact region to the identical closure of the second receptacle, in that the first closure element of the closure and the fourth closure element of the identical closure engage in one another.

10. The closure system as claimed in claim 9, wherein the inner sides and the outer side are formed as contact surfaces in particular in a congruent manner with respect to one another.

11. The closure system as claimed in claim 9, wherein the closure elements engage in one another in the manner of a groove-spring connection or a hooking connection.

12. The closure system as claimed in claim 9, wherein the at least one closure has at least one actuator, which is suitable for transferring the at least one closure-from the closed docking position into the opened docking position and which is formed such that the at least one actuator can be actuated from outside.

13. The closure system as claimed in claim 12, wherein the at least one actuator causes at least one of the closure elements to move so that the engagement thereof in another of the closure elements is released.

14. The closure system as claimed in claim 12, wherein the at least one actuator causes the second closure element or the third closure element to move so that the engagement thereof in the respectively associated closure element is released while the engagement of the first closure element of the closure in the fourth closure element of the identical closure remains intact.

15. The closure system as claimed in claim 12, wherein the at least one actuator is formed such that the at least one actuator can be actuated by way of the slide, wherein the slide cab be moved on the profile strips over the width of the receptacles transversely to the throughflow direction.

16. The closure system according to claim 9, wherein the slide includes:

- a U-shaped cross section with a base and two limbs, wherein a first limb, which faces away from the second receptacle, is formed with a gripping portion, and a second limb, which faces the second receptacle, is formed with a connecting element and a connecting element holder;
- a sliding axis which extends approximately perpendicularly to the U-shaped cross section in the direction through the slide and along which the slide is movable on the profile strips; and
- a blade which is arranged approximately parallel to the sliding axis between the limbs on the base.

17. The closure system as claimed in claim 16, wherein the first limb has a narrow insertion end, which is oriented along the sliding axis, and a wide channel end.

18. The closure system as claimed in claim 16, wherein on one side, which faces away from the gripping portion, the base is formed, obliquely with respect to the sliding axis, with a step-like wall which merges into the first limb so that the first limb is shorter in the direction of the sliding axis than the second limb.

19. The closure system as claimed in claim 16, wherein the slide has a cutter.

20. The closure system as claimed in claim 19, wherein the cutter is on the blade.

* * * * *